Dec. 29, 1925.
R. CONRADER
PUMP CONTROLLING APPARATUS
Filed May 11, 1922
1,567,184
2 Sheets-Sheet 1
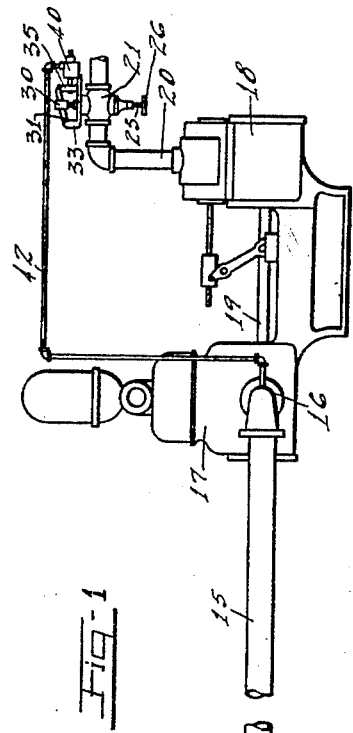
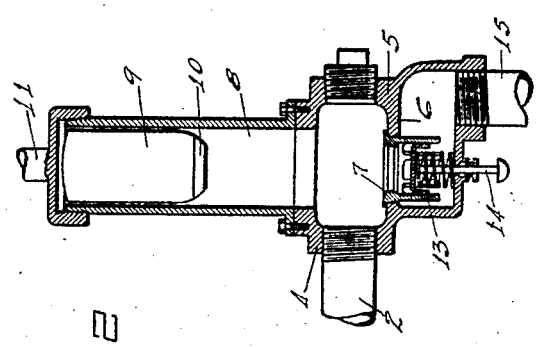
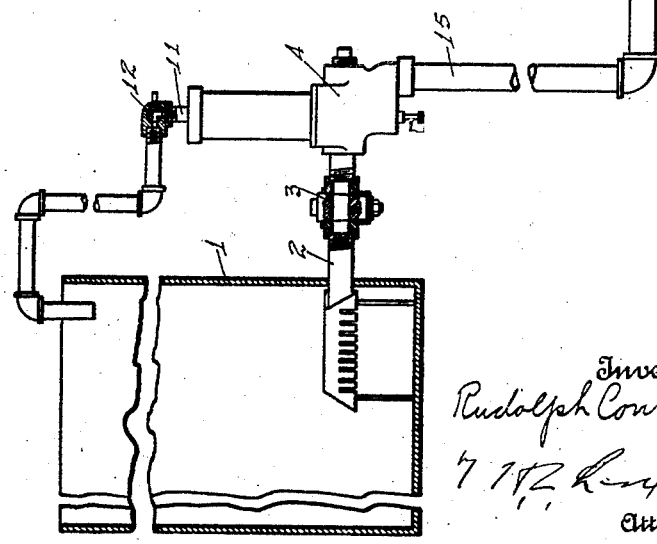
Inventor
Rudolph Conrader
Attorney

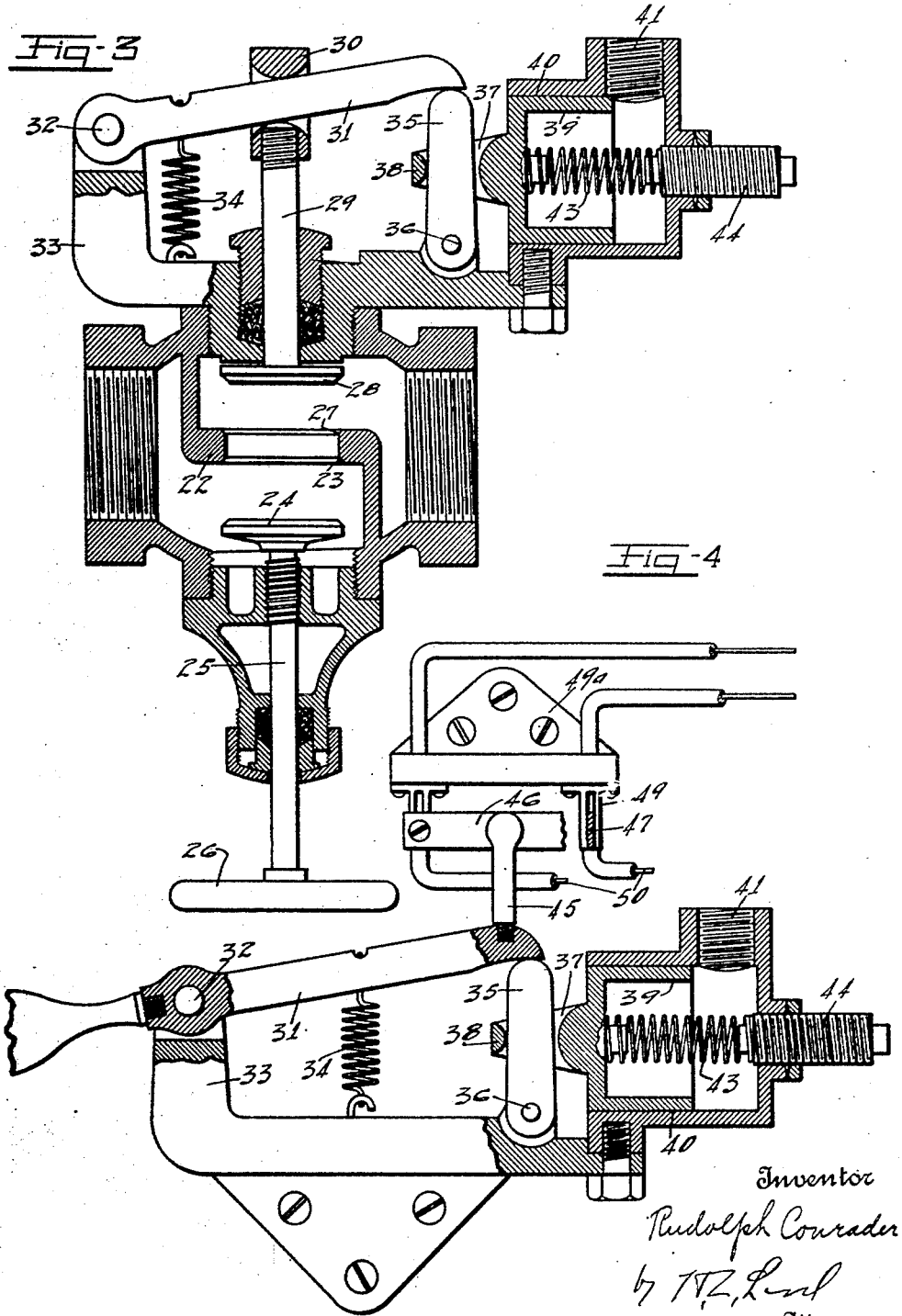

Patented Dec. 29, 1925.

1,567,184

UNITED STATES PATENT OFFICE.

RUDOLPH CONRADER, OF ERIE, PENNSYLVANIA.

PUMP-CONTROLLING APPARATUS.

Application filed May 11, 1922. Serial No. 560,240.

*To all whom it may concern:*

Be it known that I, RUDOLPH CONRADER, a citizen of the United States, residing at Erie, in the county of Erie and State of Pennsylvania, have invented new and useful Improvements in Pump-Controlling Apparatus, of which the following is a specification.

In the handling of pumps it is desirable to shut down the pump whenever the liquid is exhausted from the inlet side of the pump. This is particularly true in the pumping of tanks of oil wells because there is not only danger to the pump but if there is any leakage whatever this is carried into the lines. The present invention is designed to prevent the discharge of air from the tank to the lines and to control the pump as the flow of liquid to the pump is reduced.

The invention is illustrated in the accompanying drawings as follows:—

Fig. 1 shows a section of a tank and a connected pump.

Fig. 2 a central section of a discharge controlling valve.

Fig. 3 a sectional view of a fluid pressure motor controlling device.

Fig. 4 a similar device applied to an electric control.

1 marks the tank, 2 a discharge pipe from the tank, 3 a cut-off valve for the discharge pipe and 4 an automatic cut-off mechanism. The cut-off mechanism comprises a valve body 5 having a diaphragm 6, a valve seat 7 in the diaphragm, a float chamber 8 extending above the valve seat, a float 9 arranged in the float chamber and carrying a valve 10 at its lower end, a vent pipe 11 extending from the upper end of the chamber, a valve 12 controlling the vent pipe, a check valve 13 preventing a back-flow of fluid, and a stem 14 for forcing the valve 10 off its seat. This specific mechanism is not the subject of this application.

The control mechanism leads to a discharge pipe 15 which in turn leads to an inlet 16 of a pump 17. The pump is driven from a motor 18 through a piston rod 19. The motor receives steam or operating fluid through a pipe 20 controlled by a valve 21. The valve 21 is provided with a diaphragm 22 in which there is a diaphragm valve seat 23. A throttle valve 24 operates on the seat 23. It is provided with a stem 25 and operating handle 26. This throttle valve is used for starting and stopping the pump as desired in the usual manner. A seat 27 is arranged on the diaphragm opposite the seat 23 and a valve 28 is adapted to close on the seat 27. A stem 29 extends from the valve 28 and a yoke 30 is arranged on the top of the stem 29. A trip bar 31 extends through the yoke 30 and is pivoted on a pin 32 carried by a frame 33 secured to the body of the throttle valve. A spring 34 tends to pull the trip bar downwardly and this downward movement of the trip bar acting through the stem 29 closes the valve 28. A latch 35 is normally arranged under the end of the trip bar 31. This latch is pivoted on a pin 36, the pin being carried by the frame 33. The latch extends through a slot 37 in a projection 38 on a plunger 39. The plunger 39 is slidingly mounted in a cylinder 40. The cylinder 40 has an opening 41 from which a pipe 42 leads to the intake 16 of the pump. The movement of the plunger is resisted by a spring 43 and the resistance of this spring is adjusted by means of a screw 44.

The operation of the device is as follows: When it is desired to pump the tank the vent valve 12 is opened allowing the oil to flow into the chamber 8 and the entering liquid carries the float 9 to the upper end of the chamber. If the valve 10 should stick it may be forced off its seat by an upward movement of the valve 13 by pressure on the stem 14. The vent valve 12 is then closed and the pump is started pumping out the oil from the tank. When the oil reaches the level of the discharge pipe 2 the air entering through the upper part of this pipe passes upwardly into the chamber 8 and permits the oil in the chamber 8 to discharge. This downward movement of the oil in the chamber carries with it the float 9 and the valve 10 closes the cut-off mechanism. The continued action of the pump creates a reduced pressure at the intake and this is communicated through the pipe 42 to the cylinder 40 and the reduction of pressure back of the plunger, or piston 39, permits atmospheric pressure to force the plunger inwardly thus moving the latch 35 from under the trip bar 31 and thus closing the valve 29 and shutting down the pump. Should the pump be used in elevating liquid slightly the spring 43 may be adjusted to take care of the normal reduction in pressure without affecting the tripping action.

In the alternative construction a pin 45 is mounted on the trip bar and connected with a cross bar 46 on the switch blades 47. The switch blades operate in posts 49 carried by a frame 49ᵃ and open and close the circuit through wires 50 which wires may be connected with an actuating motor.

What I claim as new is:—

1. In a pump controlling apparatus, the combination of a pump; a liquid level controlled mechanism controlling the inlet to the pump; a pump motor; and means responding to inlet pressure controlling the motor.

2. In a pump controlling apparatus, the combination of a pump; a liquid level controlled mechanism controlling the inlet to the pump; a pump motor; and means responding to inlet pressure below normal controlling the motor.

3. In a pump controlling apparatus, the combination of a pump; a liquid level controlled mechanism controlling the inlet to the pump; a pump motor; and means responding to inlet pressure controlling the motor comprising a trip bar acting on a controlling device; a plunger tripping the bar; and a connection subjecting the plunger to intake pressure.

4. In a pump controlling apparatus, the combination of a pump; a liquid level controlled mechanism controlling the inlet to the pump; a pump motor; and means responding to inlet pressure controlling the motor comprising a trip bar; a pivoted latch under the trip bar; a plunger operating on the latch; and a connection subjecting the plunger to intake pressure.

5. In a pump controlling apparatus, the combination of a pump; a float controlled mechanism controlling the inlet to the pump; a pump motor; and means responding to inlet pressure controlling the motor.

6. In a pump controlling apparatus, the combination of a tank; a discharge pipe from the tank; a float controlled cut-off in the discharge pipe to cut off the liquid from the discharge pipe and exclude the air therefrom; a pump operating on the discharge pipe; a motor for the pump; and means responding to inlet pressure on the pump controlling the motor.

7. In a pump controlling apparatus, the combination of a pump adapted to pump a liquid; a pump motor; and means responding to the inlet pressure of a liquid leading to the pump below atmospheric pressure controlling the motor.

In testimony whereof I have hereunto set my hand.

RUDOLPH CONRADER.